US009563756B2

(12) United States Patent
Nagar

(10) Patent No.: US 9,563,756 B2
(45) Date of Patent: Feb. 7, 2017

(54) TWO PHASE PASSWORD INPUT MECHANISM

(71) Applicant: Samsung Electronics Co. Ltd., Suwon-si, Gyeonggi-do (KR)

(72) Inventor: Shubhanshu Nagar, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/762,023

(22) Filed: Feb. 7, 2013

(65) Prior Publication Data

US 2014/0223550 A1     Aug. 7, 2014

(51) Int. Cl.
| G06F 21/00 | (2013.01) |
| G06F 21/31 | (2013.01) |
| G06F 21/36 | (2013.01) |
| G06F 21/83 | (2013.01) |
| G06F 1/16 | (2006.01) |

(52) U.S. Cl.
CPC ............... *G06F 21/31* (2013.01); *G06F 1/169* (2013.01); *G06F 1/1626* (2013.01); *G06F 1/1643* (2013.01); *G06F 21/36* (2013.01); *G06F 21/83* (2013.01)

(58) Field of Classification Search
CPC ........................................................ G06F 21/36
USPC ..................................................... 726/19, 21
See application file for complete search history.

(56) References Cited

U.S. PATENT DOCUMENTS

| 8,370,926 | B1* | 2/2013 | Satish | 726/19 |
| 2004/0034801 | A1* | 2/2004 | Jaeger | 713/202 |
| 2007/0097076 | A1* | 5/2007 | Gross | 345/163 |
| 2007/0234062 | A1* | 10/2007 | Friedline | 713/183 |
| 2008/0220832 | A1* | 9/2008 | Sellgren et al. | 455/575.3 |
| 2009/0165121 | A1* | 6/2009 | Kumar | 726/19 |
| 2009/0170566 | A1* | 7/2009 | Kwon | H04M 1/0247 455/566 |
| 2010/0134418 | A1* | 6/2010 | Muresianu | G06F 1/1626 345/169 |
| 2010/0218241 | A1* | 8/2010 | Faryna | 726/5 |
| 2010/0313263 | A1* | 12/2010 | Uchida et al. | 726/18 |
| 2011/0128250 | A1* | 6/2011 | Murphy et al. | 345/174 |
| 2012/0084734 | A1* | 4/2012 | Wilairat | 715/863 |
| 2012/0167202 | A1* | 6/2012 | Kim | 726/19 |
| 2012/0174044 | A1* | 7/2012 | Koga | G06F 3/04883 715/863 |
| 2012/0189140 | A1* | 7/2012 | Hughes | 381/123 |
| 2012/0192268 | A1* | 7/2012 | Wang | 726/19 |
| 2012/0196573 | A1* | 8/2012 | Sugiyama | 455/411 |
| 2012/0235938 | A1* | 9/2012 | Laubach | 345/173 |
| 2012/0254989 | A1* | 10/2012 | Levien et al. | 726/19 |
| 2012/0266236 | A1* | 10/2012 | Miwa et al. | 726/19 |
| 2012/0297466 | A1* | 11/2012 | Li | 726/7 |

(Continued)

*Primary Examiner* — Morshed Mehedi
(74) *Attorney, Agent, or Firm* — Jefferson IP Law, LLP

(57) ABSTRACT

An apparatus and method for a two phase password input mechanism are provided. The method includes resetting a password entry, displaying a password entry screen, inputting a password element of a plurality of password elements, determining whether the entered password is complete, determining whether the entered password is correct when the entered password is complete, and if the entered password is correct, unlocking the mobile device. The plurality of password elements include at least two elements that cannot be observed from a same viewpoint.

21 Claims, 6 Drawing Sheets

(56) References Cited

U.S. PATENT DOCUMENTS

| | | | |
|---|---|---|---|
| 2013/0101127 A1* | 4/2013 | Buchmann | 381/58 |
| 2013/0167212 A1* | 6/2013 | Azar et al. | 726/7 |
| 2014/0006794 A1* | 1/2014 | Odessky et al. | 713/182 |
| 2014/0040768 A1* | 2/2014 | Lazaridis et al. | 715/752 |

* cited by examiner

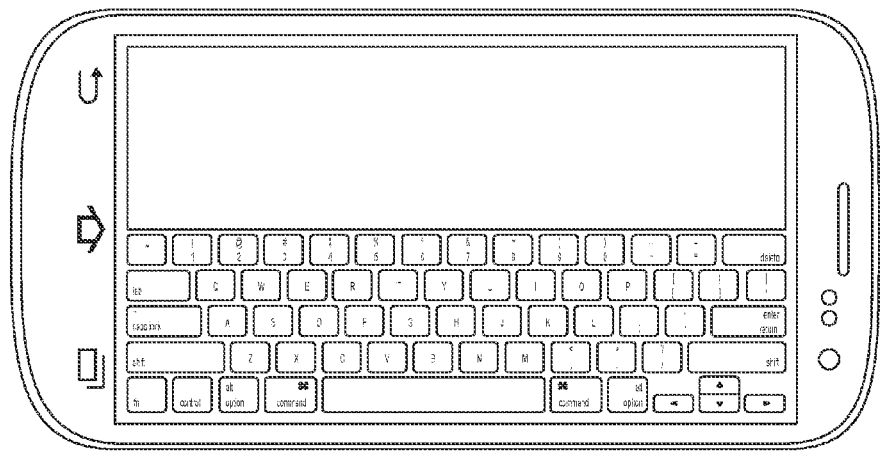
FIG. 1A
RELATED ART
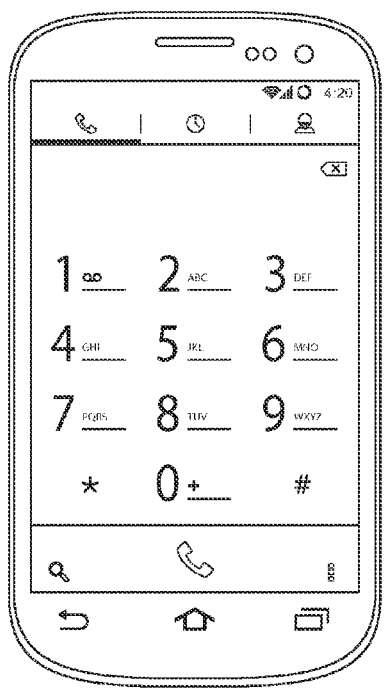 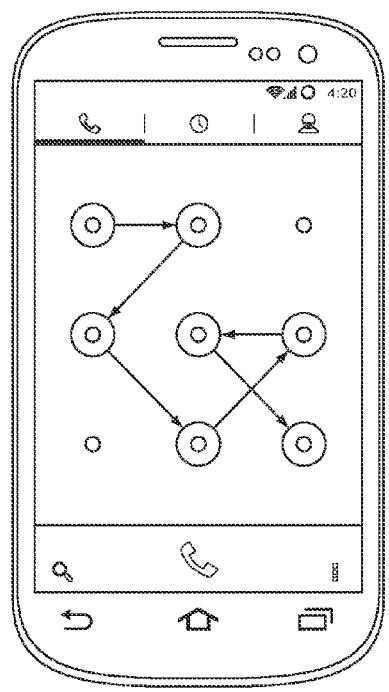
FIG. 1B
RELATED ART
FIG. 1C
RELATED ART

TWO PHASE PASSWORD INPUT MECHANISM

BACKGROUND OF THE INVENTION

1. Field of the Invention

The present invention relates to an apparatus and method for a two phase password input mechanism. More particularly, the present invention relates to an apparatus and method for a password input mechanism including at least a first and second part, where the first and second part cannot both be easily observed from a same viewpoint.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile terminals are frequently used to access information, applications, or services which are sensitive. Any personal information, for example, can be used to support an identity theft attempt. Similarly, users will often save login and password information for valuable assets such as bank accounts, web-based retailer accounts, etc.

Even if a user does not save sensitive information on a mobile terminal, access to any use of the mobile terminal might still be protected to avoid unauthorized consumption of telephone use minutes, internet data usage, or even goods and services that can be billed directly to the account holder's mobile phone bill.

If a mobile terminal is lost, whoever finds it might be tempted to use it if it can be freely accessed. Similarly, a possible thief may be discouraged from stealing the mobile terminal if he knows that it cannot be freely accessed.

For at least these reasons, it is becoming more common for mobile terminals such as smart phones to include a locking function and password protection. The mobile terminal may be generally locked, individual applications may be locked, or both may be locked to provide greater protection.

FIGS. 1A-1C show a selection of password input mechanisms according to the related art.

Referring to FIG. 1A, a keypad such as a typewriter key arrangement is shown. In this example, a password input may be any combination of words, letters, numbers, etc. The keys may be hard or soft keys. The password may be at least partly visible when entered; for example, a letter may be displayed for a predetermined time or until a next character is entered. Alternatively, a non-revealing indication such as an asterisk ('*') may be displayed on the display for each character entered.

Although people are frequently encouraged to select passwords with a high degree of randomness and to change their passwords frequently, many fail to do so. Users often pick passwords using personal meaningful information, such as a family member's name and birth date. Thus, a thief or other unauthorized user may be able to make a reasonable guess of a user's password if they can observe the display or at least some of the keys selected when the password is entered.

FIG. 1B shows a similar numeric keypad used to input a numeric password. Again, many users fail to use a sufficient degree of randomness when selecting a numeric password. For example, many users will use their birth date or a house number of a street address. The number keys are typically fewer and larger than the character keys of FIG. 1A; thus, it may be easier for an observer to determine at least some of the number keys selected when a numeric password is entered, even if they are not displayed on the screen. Further, many users use weak passwords such as based on birthdays, which significantly narrows the keyspace to be searched, even if no one directly observes the password being input.

FIG. 1C shows a third type of password input, where the "password" is not actually composed of characters but instead consists of touching a series of points in a particular order. If the mobile terminal uses a touchscreen, the finger may touch the first point in the sequence and slide from point to point until the pattern is complete. Such a password input mechanism is usually harder to guess than the letter or number passwords discussed above, because it is less common for people to have standard touch patterns that they use regularly. With this password input mechanism, the points will sometimes be configured to light up or change color as each one is touched. This confirms for the user which of the points were touched or sensed. However, it also makes it much easier for an observer to see which points are touched as the user inputs the password.

In each of the above examples, an observer may easily surreptitiously obtain some or all of the password required to unlock the mobile terminal.

Accordingly, there is a need for an apparatus and method for a two phase password input mechanism, where at least a first and second part of an input password cannot be easily observed from a same viewpoint.

SUMMARY OF THE INVENTION

Aspects of the present invention are to address at least the above-mentioned problems and/or disadvantages and to provide at least the advantages described below. Accordingly, an aspect of the present invention is to provide an apparatus and method for a two phase password input mechanism.

In accordance with an aspect of the present invention, a method for a two phase password input is provided. The method includes resetting a password entry, displaying a password entry screen, inputting a password element of a plurality of password elements, determining whether the entered password is complete, determining whether the entered password is correct when the entered password is complete, and if the entered password is correct, unlocking the mobile device. The plurality of password elements include at least two elements that cannot be observed from a same viewpoint.

In accordance with another aspect of the present invention, a method for a two phase password input is provided. The method includes resetting a password type entry for each of a plurality of password element types, displaying a password entry screen, inputting a password element of a plurality of password elements, determining whether the entered password is complete, determining whether the entered password is correct when the entered password is complete, and if the entered password is correct, unlocking the mobile device. The plurality of password elements include at least two password element types that cannot be observed from a same viewpoint.

In accordance with yet another aspect of the present invention, a mobile device is provided. The mobile device includes a locking function and a plurality of inputs to a password entry function. An entry of a password to unlock the locking function includes at least two password elements of at least two password element types that cannot be viewed from a same viewpoint.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 1A-1C are examples of password input mechanisms according to the related art;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for a two phase password input mechanism.

Figure 2A:
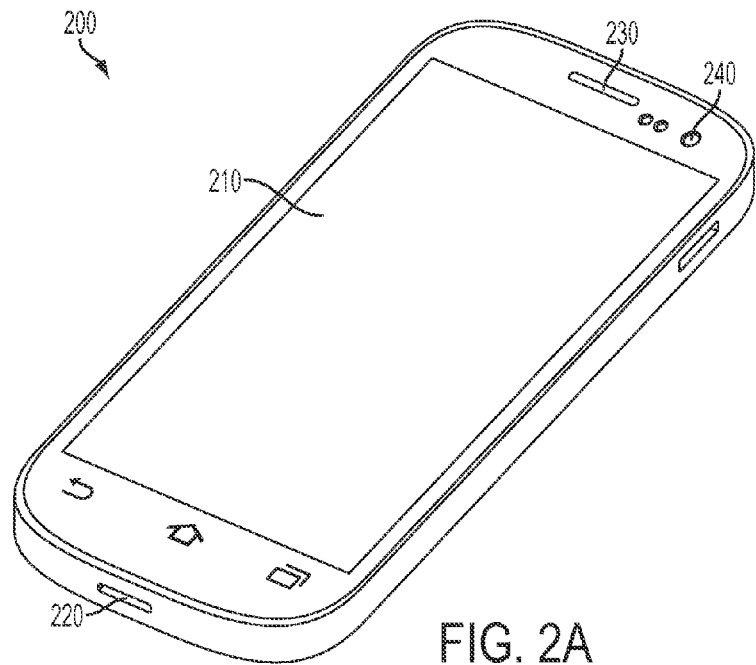
FIGS. 2A-2B show a mobile device according to an exemplary embodiment of the present invention.
Figure 2B:
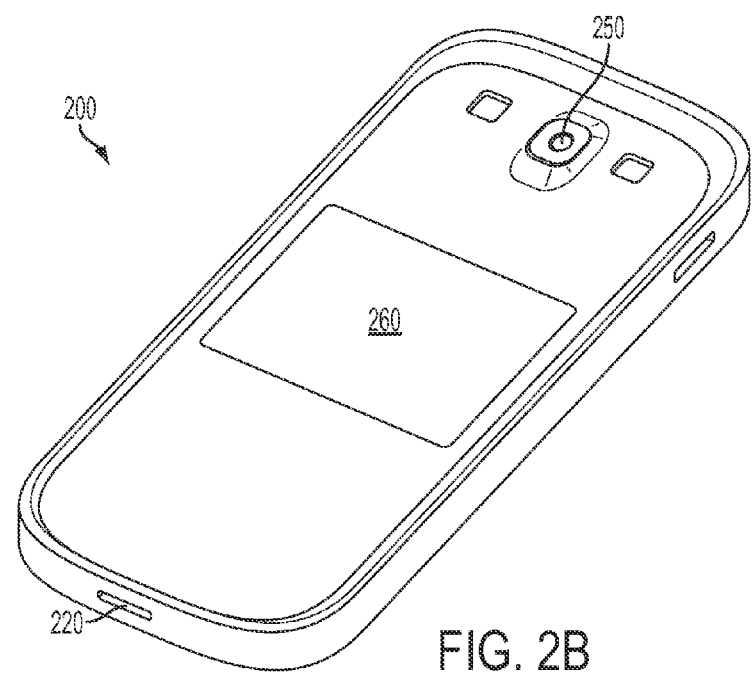

FIGS. 2A-2B show a mobile device according to an exemplary embodiment of the present invention.

Referring to FIG. 2A, a front view of a mobile device 200 is shown. In an exemplary embodiment, the mobile device 200 may include a touchscreen 210 for both input and display functions, although these functions may also be separated into a separate display screen and hard keys. The mobile device 200 may also include at least one microphone 220 for audio input, at least one speaker 230 for audio output, and at least one camera 240 for video input. The camera 240 depicted in FIG. 2A is a front-facing camera, for example, which will typically be directed towards a user in normal use of the device 200.

Referring to FIG. 2B, a rear view of the mobile device 200 is shown. In an exemplary embodiment, the mobile device 200 may include a camera module 250 and a touch input area 260. The camera module 250 depicted in FIG. 2B is typically a higher resolution camera than camera 240, but such is not required. The touch input area 260, if present, will typically be positioned approximately center so that a user's fingers of either hand may access it when the mobile device 200 is held in any orientation, but such is not required. The touch input area 260, if present, may be configured to receive and recognize a typical selection of touch inputs such as tap/select, multi-tap, drag, release, flick, etc. The touch input area 260 may comprise any portion of the back of the mobile device 200.

In an exemplary embodiment of the present invention, a password is input as a combination of inputs using at least two input methods.

Figure 3:
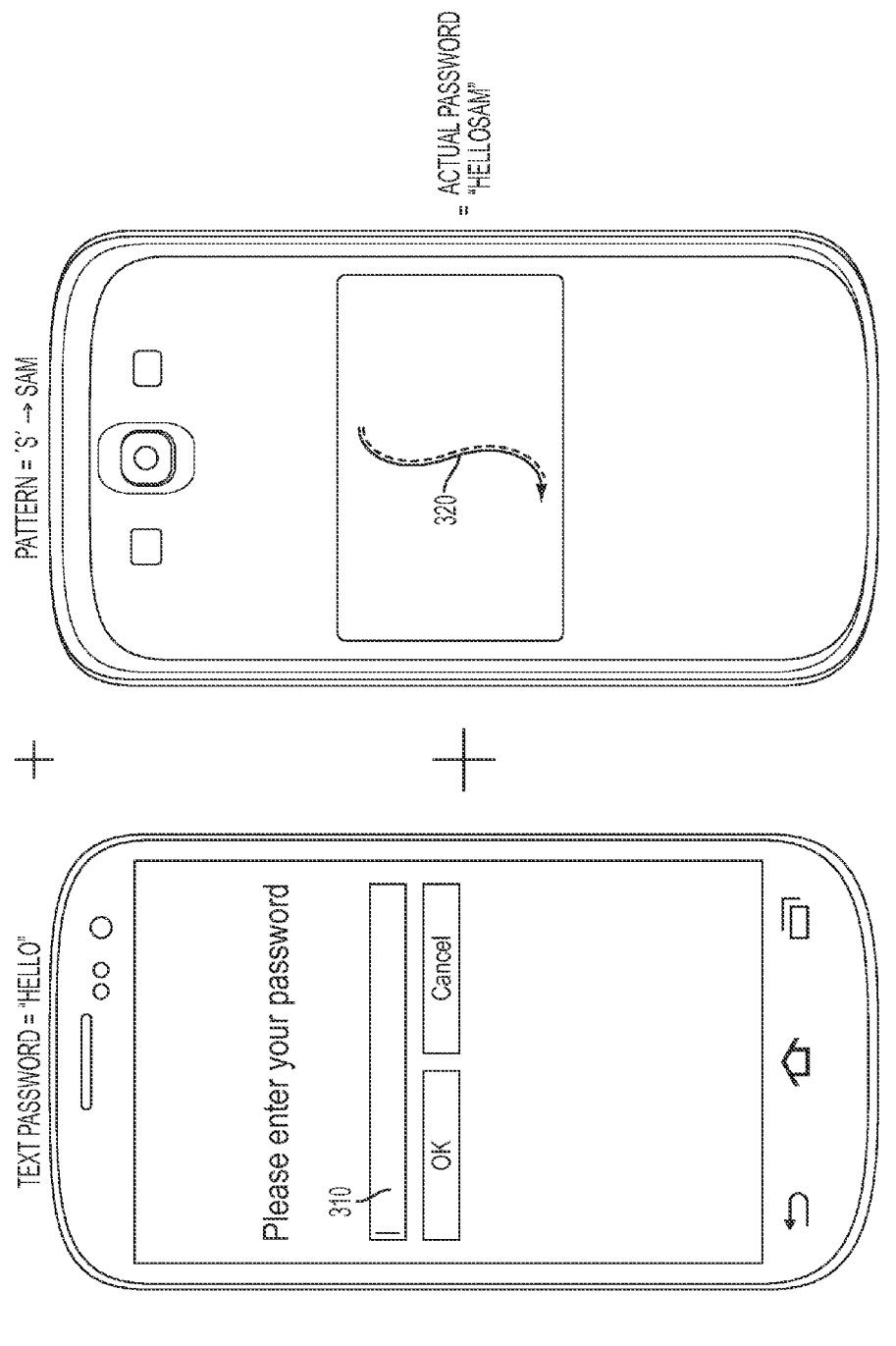
FIG. 3 illustrates a password input having text and touch inputs according to an exemplary embodiment of the present invention.

FIG. 3 illustrates a password input having text and touch inputs according to exemplary embodiments of the present invention.

Referring to FIG. 3, a password text input box 310 is displayed to a user on a front surface of a mobile device. In this example, the user enters a first part of a text password, "Hello". The text input may be displayed, although this is not recommended. Alternatively, each character of the text input may be briefly displayed so that the user can see the character was entered correctly. Alternatively, all characters input may be masked, such as with asterisks, to prevent observers from easily viewing the characters.

Continuing the password input, after the user has input "Hello", he might draw an 'S'-shaped pattern 320 on a touch sensitive area on a back surface of the mobile device. In particular, because the text input box and the touch sensitive area are on opposite sides of the mobile device, it is made very difficult for an observer to observe both inputs. In this example, the user has predefined the 'S' touch input to be recognized by the mobile device and translated into the word "sam". Thus, "sam" is appended to "Hello" to yield a final password "Hellosam". An observer might observe the "Hello" or "S" input, but is unlikely to be in position to observe both inputs. Thus, the password security is enhanced.

In uses other than password input, the rear touch input may be reproduced on the front display to assist the user. The user may wish to use such front reproduction when creating a password, but only if the user is confident the created password cannot be observed. Such reproduction is not recommended when the rear touch input comprises part of a password input, that is, when the user is entering the password to unlock the device.

In this example, the password is a text input where one part is entered by normal text input and another part is entered by a touch input. That is, the touch input is converted to a text portion of the password. The user will predefine the translation of the touch input to the desired text.

However, such is not required. For example, in an exemplary embodiment of the present invention, a password may have separate text and touch input elements, where the user may enter a text input and an untranslated touch input, such as "Σ", for example. The device will recognize the touch input within a certain tolerance; the user cannot be expected to precisely duplicate a touch entry exactly, and a similar touch input such as "[" must not be mistakenly interpreted. Any number of text and touch input elements may be combined to form a password.

Figure 4C:
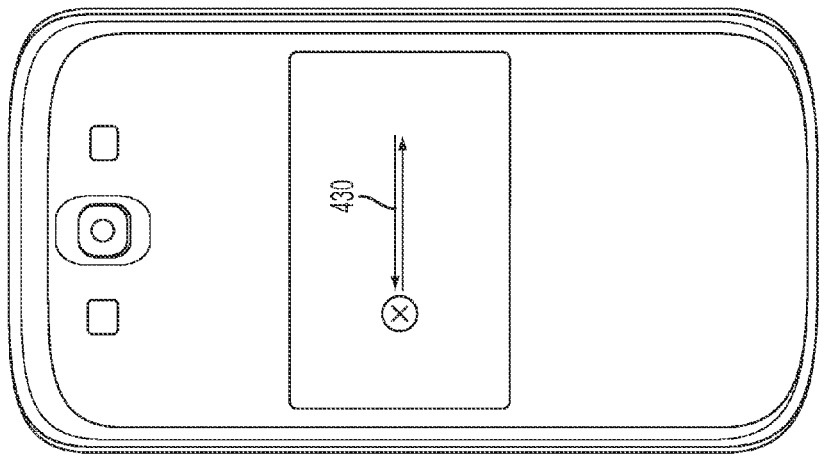
FIGS. 4A-4C illustrate a set of three touch inputs according to an exemplary embodiment of the present invention.
Figure 4B:
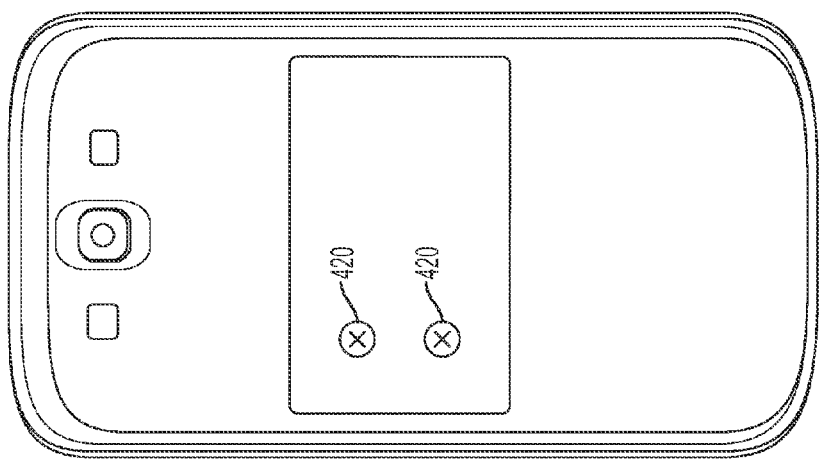
Figure 4A:
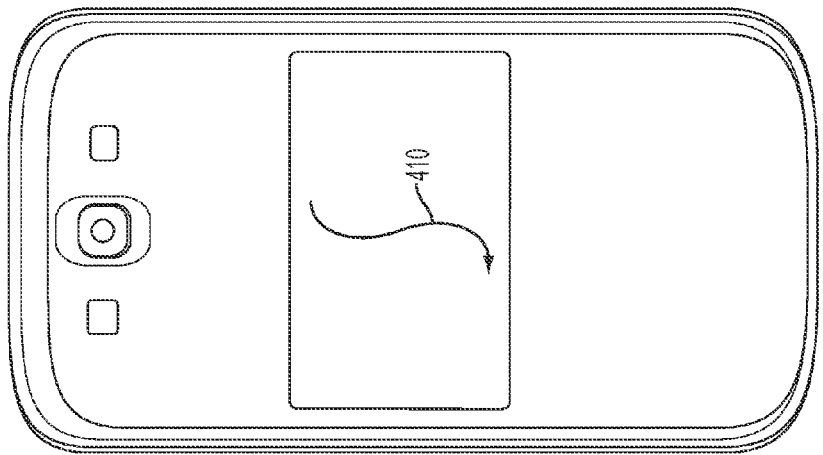

FIGS. 4A-4C illustrate a set of three touch inputs according to an exemplary embodiment of the present invention.

Referring now to FIGS. 4A-4C, a set of three touch inputs are shown. A first touch input 410 might include a downward "S" shape, a second touch input 420 might include concurrent double taps of two fingertips, and a third touch input 430 might include a double drawn line where the user drags the contact point in a line horizontally and then back over the same line.

If the touch input is not converted into text, the text and touch elements may be stored separately such that they may be entered in any order. In the example of FIG. 3, if the "S" touch input is not interpreted, then the "S" touch input may be entered before, concurrently with, or after the text "Hello" is entered.

Alternatively, the elements may be appended sequentially, such that they must be entered in a particular order. Thus, even if the "S" is not translated to the text "sam", the user may still be required to enter the text "Hello" prior to the touch input "S" to unlock the device.

If the elements are stored separately, multiple touch inputs must still be entered in a predetermined sequence, similar to the characters of a text input. If the elements are appended to a single password input, then of course the precise order of all elements must be correct to successfully unlock the device.

In the above examples, a touch input has been described as a second password input element. However, the present invention is not limited thereto. The present invention contemplates any combination of inputs where an observer cannot readily observe all the inputs.

In an exemplary embodiment of the present invention, the password may include a combination of a text input and an audio input. The audio input may be any sound the user may readily produce, such as a word, a hummed melody, etc. In this exemplary embodiment, it is recommended that a sensitive microphone be used so that the user may produce the audio element at a low volume that may be difficult for the casual observer to overhear clearly.

If the audio input is used as a second element, it may be translated and appended to the text input. For example, the user may enter the text "Hello" and speak the word "sam". In this case, a speech recognition application may translate the spoken word "sam" to the text "sam", and append that text to the previously entered text "Hello" to produce "Hellosam".

If the audio input is used as a second element, the speech recognition application may be trained to recognize a particular user's voice, comparable to face recognition applications. Thus, even if an observer overhears the audio element, the observer may not be able to reproduce the password input without duplicating the tone and timbre of the user's voice.

In an exemplary embodiment of the present invention, a mobile device may include one or more highly sensitive accelerometers. If the accelerometers are included, they will typically measure a direction and degree of tilt of the mobile device. Thus, the accelerometer inputs may comprise an input element. For example, the device may be tilted up, up, down, down, left, right, left, right. The accelerometer input can also be based on other characteristics such as a degree of tilt, a speed of tilt, a pause, a rotational motion, etc.

However, the accelerometer input may be observable regardless of the observer's position. Thus, if accelerometer password inputs are used, it is recommended that they be combined with at least two other password input elements that are difficult to observe together, such as front text and rear touch, front text and sensitive microphone, etc.

In an exemplary embodiment of the present invention, a user may disable any elements of password input in order to avoid accidentally entering an input that is not part of the password. For example, the user may disable accelerometer input in order to enter the password while holding the device at any angle.

Figure 5:
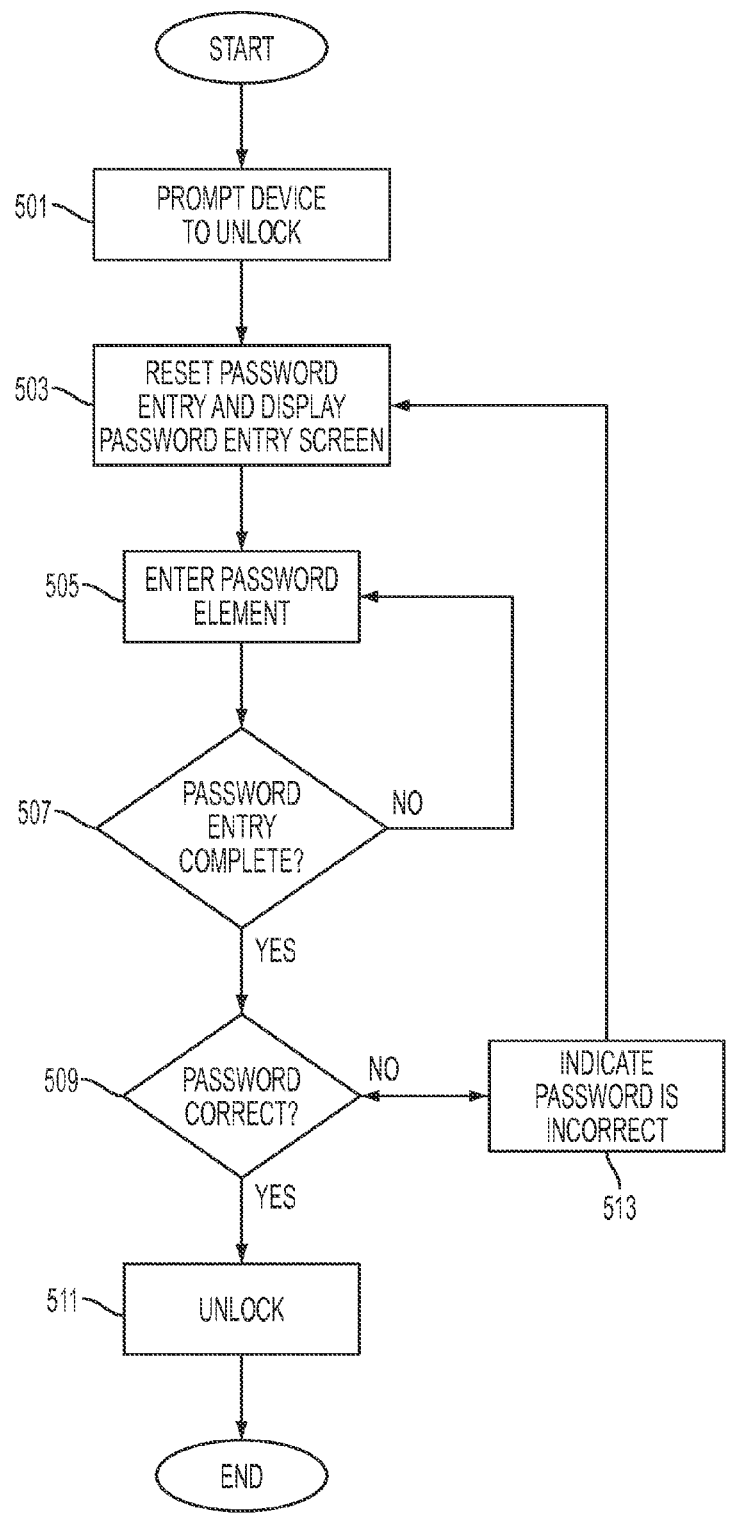
FIG. 5 shows a flowchart of a two-phase password input according to an exemplary embodiment of the present invention.

FIG. 5 shows a flowchart of a two-phase password input according to an exemplary embodiment of the present invention.

Referring now to FIG. 5, in step 501, the mobile device awakened from a sleep state, powered on, or otherwise prompted that a user wishes to unlock the device. In step 503, the mobile device resets a password entry to zero and displays a password entry screen. In step 505, the user enters a password element, which is appended to the existing password entry. Thus, if the entered element is the first element entered, then the password entry will be the entered element; if the entered element is the second element entered, the password entry will be the first and second elements appended, etc. Because the elements are appended in this exemplary embodiment, the sequence of elements entered must be correct to unlock the mobile device. Touch inputs, if not translated to text, are stored in a simplified format with codes corresponding to inputs such as "tap in center sector," "drag in the following sequence of sectors," etc.

In step 507, the device checks whether the user has indicated that the password entry is complete. This will typically be through a button of the front text input dialogue box, but the present invention is not limited thereto. If the user has not indicated that the password entry is complete, then the method returns to step 505. If the user has indicated that the password entry is complete, the method proceeds to step 509.

In step 509, the device checks whether the entered password is correct. For example, when the password is created, it may be run through a hash function and the output stored. To check the password, the device may run the password entry through the same hash function and compare the output to the stored password hash. Various other methods of checking a password are known in the art and usable with exemplary embodiments of the present invention, and therefore a description thereof will be omitted herein.

If the password entry is correct, the device unlocks in step 511 and the method concludes. If the password entry is incorrect, the device indicates the entry is incorrect in step 513, and then returns to step 503.

Figure 6:
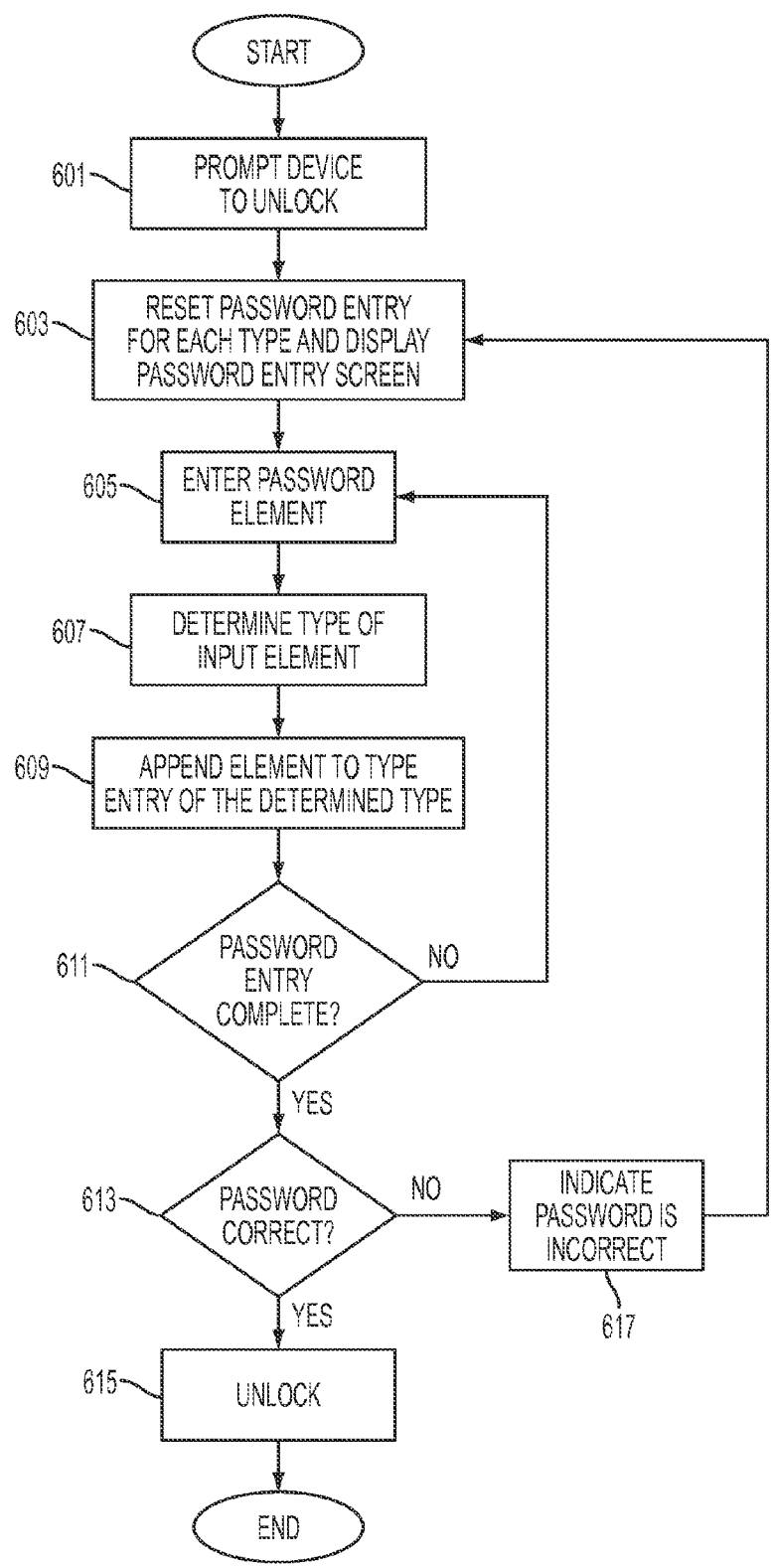
FIG. 6 shows a flowchart of a two-phase password input according to an exemplary embodiment of the present invention.

FIG. 6 shows a flowchart of a two-phase password input according to an exemplary embodiment of the present invention.

Referring now to FIG. 6, in step 601, the mobile device awakened from a sleep state, powered on, or otherwise prompted that a user wishes to unlock the device. In step 603, the mobile device resets a password entry of each type to zero and displays a password entry screen.

In step 605, the user enters a password element. In step 607, the mobile device determines a type of the input element. For example, the type might be text, rear touch, audio, or tilt. In step 609, the input element is appended to a type password entry of the determined type. Thus, if the entered element is the first text element entered, then the text password entry will be the entered text; if the entered element is the second rear touch element entered, the rear touch password entry will be the first and second rear touch elements appended, etc. Because the elements of each type are appended in this exemplary embodiment, the sequence of elements entered of each type must be correct to unlock the mobile device. However, in an exemplary embodiment of the present invention the user may enter the various types of elements in any order. For example, the user might enter all text elements first, and then all rear touch elements. Alternatively, the user might alternate entry of text elements and rear touch elements.

In step 611, the device checks whether the user has indicated that the password entry is complete. This will typically be through a button of the front text input dialogue box, but the present invention is not limited thereto. If the user has not indicated that the password entry is complete, then the method returns to step 605. If the user has indicated that the password entry is complete, the method proceeds to step 613.

In step 613, the device checks whether the entered password is correct. For example, when the password is created, it may be run through a hash function and the output stored. To check the password, the device may first append the various type password entries together, and then run the resulting two phase password entry through the same hash function and compare the output to the stored password hash. Various other methods of checking a password are known in the art and usable with exemplary embodiments of the present invention, and therefore a description thereof will be omitted herein.

If the password entry is correct, the device unlocks in step 615 and the method concludes. If the password entry is incorrect, the device indicates the entry is incorrect in step 617, and then returns to step 603.

Although the methods of FIGS. 5-6 are described with respect to unlocking a mobile device, the present invention is not limited thereto. Exemplary embodiments of the present invention include any device, apparatus, application, website, or other context wherein access is protected via a password function.

When entering a password for any purpose other than unlocking a device that natively supports the different password elements described above, it is preferred that the password elements be translated to text elements. For example, a user may wish to log in to a mobile banking website without his text password entry being visible to an observer, because he is in an unsecure environment. The user may then enter his standard text password as a combination of elements, for example, a front keypad element and a rear touch element, when in the unsecure environment, and enter his password as standard text when in a secure environment, for example, at home.

Exemplary embodiments of the present invention can thus provide secure password entry for any password protected context. A password protected context includes, but is not limited to: access to a mobile device; access to a function of the mobile device, for example, a telephone function; access to an application on the mobile device; access to data on the mobile device, for example, contacts information; access to a storage area on the mobile device, for example, a user's home directory; and access to an external context, for example, a password protected website or a mobile banking interface.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for two phase password entry in a mobile device, the method comprising:
   resetting a password entry for a password protected context;
   displaying a password entry screen;
   receiving an input password element of a password, the password comprising a plurality of password elements;
   determining whether the password entry is complete;
   determining, when the password entry is complete, whether the entered password is correct; and
   unlocking, if the entered password is correct, the password protected context,
   wherein the plurality of password elements comprise at least two different password elements of respective password element types entry of which cannot be directly seen at a same time by a person, and
   wherein the receiving of the password element comprises adding the input password element to the password entry.

2. The method of claim 1, wherein one of the plurality of password elements comprises an alphanumeric text password element type.

3. The method of claim 1, wherein, if the input password element does not comprise alphanumeric text, the method further comprises:
   determining whether a string of alphanumeric text corresponds to the password element;
   translating, upon determining that the string corresponds to the password element, the password element to the string; and
   adding the string to the password entry as a password element type of the password element.

4. The method of claim 1, wherein the plurality of password elements comprise at least two of alphanumeric text characters, a touch input, an audio input, or an accelerometer input.

5. The method of claim 4, wherein, if the plurality of password elements comprise a touch input password element type and an alphanumeric text password element type, the touch input password element type is entered on an opposite surface of the mobile device from the alphanumeric text password element type.

6. The method of claim 4, further comprising:
recognizing, if the plurality of password elements comprise the audio input, at least one of recognized speech, a melody, or a recognized user's voice, as the audio input.

7. A method for two phase password entry in a mobile device, the method comprising:
resetting a password element type entry for each of a plurality of password element types of a password protected context;
displaying a password entry screen;
receiving an input password element of a password, the password comprising a plurality of password elements of different password element types;
determining whether the password entry is complete;
determining, when the password entry is complete, whether the entered password is correct; and
unlocking, if the entered password is correct, the password protected context,
wherein the plurality of password elements comprise at least two different password elements of respective password element types entry of which cannot be directly seen at a same time by a person, and
wherein the receiving of the password element comprises adding the input password element to the respective password element type entry.

8. The method of claim 7, wherein the receiving of the password element further comprises:
determining a respective password element type of the password element; and
adding the password element to a corresponding password element type entry.

9. The method of claim 8, wherein one of the plurality of password element types comprises an alphanumeric text type.

10. The method of claim 7, wherein the plurality of password element types comprise at least two of an alphanumeric text type, a touch input type, an audio input type, or an accelerometer input type.

11. The method of claim 10, wherein, if the plurality of password element types comprise the touch input type and the alphanumeric text type, the touch input password element type is entered on an opposite surface of the mobile device from the alphanumeric text password element type.

12. The method of claim 10, wherein, if the plurality of password element types comprise the audio input type, the audio input password element comprises at least one of recognized speech, a melody, or a recognized user's voice.

13. A mobile device comprising:
at least one hardware processor;
a locking function; and
a plurality of inputs to a password entry function,
wherein receiving a password to unlock the locking function comprises receiving at least two different password elements of at least two different password element types entry of which cannot be directly seen at a same time by a person, and
wherein the inputting of the password elements comprises adding the plurality of password elements to the password entry.

14. The mobile device of claim 13, further comprising:
an alphanumeric text input,
wherein alphanumeric text comprises one of the password element types.

15. The mobile device of claim 14, further comprising:
a touch input located on an opposite side of the device from the alphanumeric text input,
wherein touch on the touch input comprises one of the password element types.

16. The mobile device of claim 13, wherein the password element types comprise at least two of an alphanumeric text type, a touch input type, an audio input type, or an accelerometer input type.

17. The mobile device of claim 13, wherein the password comprises the at least two password elements, of corresponding different password element types, entered in a predetermined sequence.

18. The mobile device of claim 13, wherein the password is correct only if the password elements of each password element type are received in a predetermined sequence with regard to other password elements of a same password element type.

19. The mobile device of claim 13, wherein the locking function comprises one of locking access to the mobile device, locking access to a function of the mobile device, locking access to an application on the mobile device, locking access to a storage area on the mobile device, locking access to data on the mobile device, and locking access through the mobile device to an external context.

20. The method of claim 8, wherein, if the password element type of the received password element type does not comprise an alphanumeric text type, the method further comprises:
determining whether a string of alphanumeric text corresponds to the received password element;
translating, upon determining that the string corresponds to the received password element, the received password element to the string; and
adding the string to a password element type entry corresponding to the received password element.

21. The method of claim 1, wherein the entered password is determined to be complete when each of a plurality of different password element types, of the plurality of password elements which the password comprises, have been received.

* * * * *